United States Patent [19]

Sakai et al.

[11] Patent Number: 4,931,499

[45] Date of Patent: Jun. 5, 1990

[54] RUBBER COMPOSITION DERIVED FROM FLUOROELASTOMER AND ETHYLENE-ALPHA-OLEFIN COPOLYMER RUBBER AND RUBBER ARTICLE FORMED THEREFROM

[75] Inventors: Masato Sakai, Suzuka; Itsuki Umeda, Mie; Yasuo Takeuchi, Yokkaichi; Yasuhiko Takemura, Funabashi, all of Japan

[73] Assignee: Japan Synthetic Rubber Co., Ltd., Tokyo, Japan

[21] Appl. No.: 272,823

[22] Filed: Nov. 18, 1988

[30] Foreign Application Priority Data

Nov. 20, 1987 [JP] Japan ................... 62-291744

[51] Int. Cl.$^5$ ................... C08L 23/26; C08L 27/14; C08L 27/16; C08L 27/18
[52] U.S. Cl. ................... 525/194; 525/199; 524/520
[58] Field of Search ................... 525/194, 192, 199

[56] References Cited

U.S. PATENT DOCUMENTS 3,562,195 2/1971 Reiner et al. .

FOREIGN PATENT DOCUMENTS 133442 11/1974 Japan .
146752 12/1978 Japan .
 93040  7/1979 Japan .
160037 12/1980 Japan .
135843  8/1982 Japan .
206857 10/1985 Japan .
 34935  2/1987 Japan .
121749  6/1987 Japan .

OTHER PUBLICATIONS

Chemical Abstracts, vol. 107, No. 22, Nov. 30, 1987, Abstract No. 200130g.

*Primary Examiner*—Carman J. Seccuro
*Attorney, Agent, or Firm*—Oblon, Spivak, McClelland, Maier & Neustadt

[57] ABSTRACT

A rubber composition obtained by subjecting a mixture of (I) 35-95 parts by weight of a fluoroelastomer and (II) 65-5 parts by weight of an ethylene-α-olefin copolymer rubber in which the total of the (I) component and the (II) component is 100 parts by weight and a crosslinking agent for the ethylene-α-olefin copolymer rubber (II) to reaction while imparting shearing deformation to the mixture. Said rubber composition is excellent in processability on roll and in extruder, heat resistance, steam resistance, weather resistance, compression set and resistance to compressive load. A rubber article is obtained by subjecting the above rubber composition and a crosslinking agent for the fluoroelastomer (I) and optionally at least one additive to reaction, said rubber article being excellent in heat resistance, weather resistance, compression set and resistance to compressive load and hence can be used in the fields of general industry, electric industry and chemical industry.

20 Claims, No Drawings

RUBBER COMPOSITION DERIVED FROM FLUOROELASTOMER AND ETHYLENE-ALPHA-OLEFIN COPOLYMER RUBBER AND RUBBER ARTICLE FORMED THEREFROM

BACKGROUND OF THE INVENTION

This invention relates to a rubber composition, and more particularly to a rubber composition comprising a fluoroelastomer and an ethylene-α-olefin copolymer rubber excellent in processability such as processability on roll and/or in extruder, heat resistance, steam resistance, weather resistance, compression set and resistance to compressive load.

The requirement for performance of rubber material has recently become severe year by year, and a change has started in the type of rubber material to be used, fluoroelastomer excels other special rubbers in solvent resistance, heat resistnace, chemical resistance and weather resistance, and the demand thereof is increasing in fields of industrial product, automobile and aircraft year by year. However, the fluoroelastomer is much more expensive than the other elastomers, and has higher specific gravity than the others. Therefore, the price of products made therefrom becomes remarkably high, and hence, the field in which fluoroelastomer is used has been limited. It has become difficult for one sort of rubber stock to meet simultaneously the inconsistent requirements of high performance and low price as mentioned above.

In order to meet such requirements, it has been proposed to mix a fluoroelastomer with another elastomer. The elastomer to be mixed with the fluoroelastomer is often an elastomer having a polar group such as an acrylonitrile-butadiene rubber, an acrylic rubber, a chlorohydrin rubber or the like.

Even when such an elastomer having a polar group is mixed with the fluoroelastomer; however, as satisfactory performance has been obtained because it has been difficult to obtain a uniform mixing state between the elastomer and the fluoroelastomer.

On the other hand, Japanese Patent Application Kokai No. 34,935/87 proposes a method of mixing a fluoroelastomer with an ethylene-α-olefin copolymer rubber which is a non-polar elastomer, in which the ethylene-α-olefin copolymer rubber is first partially crosslinked and then mixed with the fluoroelastomer. Said partial crosslinking is achieved by dissolving the ethylene-α-olefin copolymer rubber in a solvent such as n-hexane or the like, re-emulsifing the resulting solution and then partially crosslinking the copolymer rubber in the form of a latex with an organic peroxide. This method is, however, complicated in steps because it requires the steps of dissolution of rubber, re-emulsification, removal of solvent and partial crosslinking in the latex state, and the method is also disadvantageous in energy. In addition, the composition obtained tends to be inferior in compression set.

SUMMARY OF THE INVENTION

This invention aims at solving the abovementioned problem of the prior art by improving greatly the compatibility of a fluoroelastomer with an ethylene-α-olefin copolymer rubber and provides a rubber composition excellent in processability, heat resistance, steam resistance, compression set and resistance to compressive load.

According to this invention, there is provided a rubber composition obtained by subjecting a mixture of (I) 35-95 parts by weight of a fluoroelastomer and (II) 65-5 parts by weight of an ethylene-α-olefin copolymer rubber and a crosslinking agent for the copolymer rubber (II) to reaction while imparting shearing deformation to the mixture (the above rubber composition is in some cases referred to as the fluoroelastomer composition).

This invention further provides a rubber article obtained by subjecting to reaction a mixture of the above rubber composition, a crosslinking agent for the fluoroelastomer (I).

DETAILED DESCRIPTION OF THE INVENTION

The fluoroelastomer (I) used in this invention includes rubbers prepared from combinations of fluorine-containing monomers selected from vinylidene fluoride, hexafluoropropane, pentafluoropropane, trifluoroethylene, trifluorochloroethylene, tetrafluoroethylene, vinyl fluoride, perfluoro(methyl vinyl ether), perfluoro(propylidene) and the like, and rubbers prepared by copolymerizing the above combination with monomers copolymerizable therewith such as vinyl compounds, for example, acrylic acid esters and the like; olefin compounds, for example, propylene and the like; diene compounds; or chlorine-, bromine- or iodine-containing vinyl compounds.

Specific examples of the fluoroelastomer (I) are vinylidene fluoride-hexafluoropropylene copolymer, vinylidene fluoride-hexafluoropropylene-tetrafluoroethylene terpolymer, tetrafluoroethylene-propylene copolymer, tetrafluoroethylene-vinylidene fluoridepropylene terpolymer and the like.

The fluoroelastomer (I) can be classified into a type crosslinkable with a combination of an organic peroxide and a crosslinking co-agent [referred to hereinafter as fluoroelastomer (I-a)] and a type not crosslinkable with an organic peroxide but crosslinkable with an aromatic dihydroxy crosslinker or an amine [referred to hereinafter as fluoroelastomer (I-b)]. The fluoroelastomer (I-a) includes specifically Aflas series (products of Japan Synthetic Rubber Co., Ltd.), Viton GF (product of DuPont U.S.A.), Daiel G 902 (product of Daiken Kogyo) and the like, ahd the fluoroelastomer (I-b) includes specifically Viton A, Viton B and Viton E60 (products of DuPont, U.S.A.), Technoflon (product of Montecatini-Edison, Italy) and the like.

The Mooney viscosity ($ML_{1+4}$, 100° C.) of the fluoroelastomer (I) is not critical and may be preferably 30-150.

In the ethylene-α-olefin copolymer rubber (II) used in this invention, the α-olefin used as a comonomer is an α-olefin having 3 to 12 carbon atoms, and specific examples thereof are propylene, butene-1, 4-methylpentene-1, hexene-1 and octene-1. Propylene is preferred.

The above α-olefins may be used alone or in admixture of two or more.

The ethylene-α-olefin copolymer rubber (II) may contain a non-conjugated diene monomer as a copolymer constituent, and the non-conjugated compound includes dicyclopentadiene, tricyclopentadiene, 5-methyl-2,5-norbornadiene, 5-methylene-2-norbornene, 5-ethylidene-2-norbornene, 5-isopropylidene-2-norbornene, 5-isopropenyl-2-norbornene, 5-(1-butenyl)-2-norbornene, cyclooctadiene, vinylcyclohexane, 1,5,9- cyclododecatriene, 6-methyl-4,7,8,9-tetrahydroindene, 1,4-hexadiene, 2-methyl-1,4-hexadiene, 1,6-octadiene, 1,7-octadiene, 1,8-nonadiene, 1,9-decadiene, 3,6-dimethyl-1, 7-octadiene, 4,5-dimethyl-1, 7-octadiene, 1,4,7-octatriene, 5-methyl-1,8-nonadiene and the like.

Among these non-conjugated diene monomers, 5-ethylidene-2-norbornene (ENB), dicyclopentadiene (DCP) and 1,4-hexadiene are particularly preferable and may be used alone or in admixture of two or more.

The ethylene-α-olefin copolymer rubber (II) may be a modified ethylene-α-olefin copolymer in which a halogen, an unsaturated dicarboxylic acid or anhydride or a maleimide is added to the ethylene-α-olefin copolymer, or a copolymer rubber obtained by reacting an unsaturated dicarboxylic acid-modified ethylene-α-olefin copolymer with allyl glycidyl ether, vinyl glycidyl ether or the like in the presence of a catalyst such as a tertiary amine or the like.

In the ethylene-α-olefin copolymer rubber (II) used in this invention, the proportions of the ethylene, the α-olefin and the optional non-conjugated diene monomers used are such that the iodine value of the copolymer is 50 or less, preferably 30 or less.

The Mooney viscosity ($ML_{1+4}$, 100° C.) of the ethylene-α-olefin copolymer rubber (II) is preferably 5–150, more preferably 10–70.

The weight ratio of the fluoroelastomer (I) to the ethylene-α-olefin copolymer rubber in the rubber composition of this invention is 35–95/65–5, preferably 65–90/35–10 in which (I)+(II)=100 parts by weight. When the proportion of the fluoroelastomer (I) is less than 35 parts by weight, the heat resistance which is characteristic of fluoroelastomer is greatly deteriorated, and when the proportion exceeds 95 parts by weight the resistance to compression force becomes inferior.

The crosslinking agent for the ethylene-α-olefin copolymer rubber to be mixed with a mixture of the fluoroelastomer (I) and the ethylene-α-olefin copolymer rubber includes, for example, organic peroxides, sulfur-type vulcanizing agents, resin type vulcanizing agents, quinoide-type vulcanizing agents and the like.

In the rubber composition of this invention, the composition of the fluoroelastomer (I-a) or (I-b), the ethylene-α-olefin copolymer rubber (II) and the crosslinking agent for the ethylene-α-olefin copolymer rubber (II) includes the following combinations.

(1) Fluoroelastomer (I-a)/ethylene-α-olefin copolymer rubber (II)/organic peroxide, (2) Fluoroelastomer (I-b)/ethylene-α-olefin copolymer rubber (II)/organic peroxide, (3) Fluoroelastomer (I-a)/fluoroelastomer (I-b)/ethylene-α-olefin copolymer rubber (II)/organic peroxide, (4) Fluoroelastomer (I-a)/ethylene-α-olefin copolymer rubber (II)/quinoide-type vulcanizing agent, (5) Fluoroelastomer (I-a)/ethylene-α-olefin copolymer rubber (II)/sulfur-type vulcanizing agent, ('(6) Fluoroelastomer (I-b)/ethylene-α-olefin copolymer rubber (II)/resin-type vulcanizing agent, (7) Fluoroelastomer (I-b)/ethylene-α-olefin copolymer rubber (II)/sulfur-type vulcanizing agent.

Of these combinations, combinations (1) and (3) are preferred.

In the above combination (3), it is necessary that the amount of the fluoroelastomer (I-a) be at least 5% by weight based on the total weight of the fluoroelastomer. Also, in the combination (3), a crosslinking co-agent may optionally be added to the composition.

The above organic peroxide includes, for example, 2,5-dimethyl-2,5-di(t-butylperoxy)hexyne-3, 2,5-dimethyl-2,5-di(t-butylperoxy)hexane, α,α'-bis(t-butylperoxy)-p-diisopropylbenzene, dicumyl peroxide, di-t-butyl-peroxide, t-butyl benzoate, 1,1-bis(t-butyl-peroxy)-3,3,5-trimethylcyclohexane, 2,4-dichlorobenzoyl peroxide, benzoyl peroxide, p-chlorobenzoyl peroxide and the like, and preferred are 2,5-dimethyl-2,5-di(t-butylperoxy)hexyne-3, 2,5-dimethyl-2,5-di(t-butylperoxy)hexane, and α,α'-bis(t-butylperoxy)-p-diisopropylbenzene.

These organic peroxides may be used alone or in admixture of two or more.

The amount of the organic perioxide which is a crosslinking agent for the ethylene-α-olefin copolymer rubber (II) blended is preferably 0.01–5 parts by weight, more preferably 0.05–2 parts by weight, per 100 parts by weight of a total of the fluoroelastomer (I) and the ethylene-α-olefin copolymer rubber (II). When the amount is less than 0.01 part by weight, the crosslinking of the ethylene-α-olefin copolymer rubber is not sufficient, the processability of the rubber composition is not sufficient, and the compression set and resistance to compressive load of the vulcanizate are not sufficient. On the other hand, when the amount exceeds 5 parts by weight, the fluoroelastomer (I) becomes crosslinked, too and the processability tends to be deteriorated thereby. Also, the composition obtained becomes inferior with respect of physical properties of vulcanizate such as mechanical strengths, elongation and the like.

As the crosslinking co-agent, there may be used a wide range of compounds including functional monomers such as allyl compounds, (meth)acrylate compounds and divinyl compounds; functional polymers such as polybutadiene and the like; oxime compounds and sulfur compounds. In view of crosslinkability and kneadability during blending, reactive unsaturated compounds are preferable, and in view of compression set, heat resistance and characteristics of vulcanizate, particularly preferred are polyallyl compounds and polyfunctional compounds such as 1,2-polybutadiene.

The polyallyl compound which may be appropriately used in this invention includes compounds having at least two allyl groups ($—CH_2CH=CH_2$), for example, diallyl ether of glycerine; polyallyl group-substituted alkyl or aromatic amines such as diallylamine, triallylamine and the like; polyallyl group-substituted phosphoric acids and phosphorus acids such as triallyl phosphate and the like; polyallyl group-substituted carboxylic acids such as diallyl succinate, diallyl adipate, diallyl phthalate and the like; diallylmelamine; triallyl cyanurate; triallyl isocyanurate; and the like. These may be used alone or in admixture of two or more. The preferable examples thereof are those which have a boiling point of at least 30° C. at a reduced pressure of 2 mmHg such as triallyl cyanurate (162° C./2 mmHg), triallyl phosphate (157° C./44 mmHg), triallyl isocyanurate, diallyl phthalate (161° C./4 mmHg) and diallylmelamine.

The amount of the crosslinking co-agent added is 0.1–10 parts by weight, preferably 1–7 parts by weight, per 100 parts by weight of a total of the fluoroelastomer (I) and the ethylene-α-olefin copolymer rubber (II).

In this invention, the addition of the cross-linking agent to the mixture of the fluoroelastomer (I) and the ethylene-α-olefin copolymer rubber (II) may be conducted by adding the (I) component, the (II) component and the crosslinking agent simultaneously and kneading the resulting mixture, or alternatively, previously mixing the (I) component with the (II) component, then adding the crosslinking agent to the resulting mixture and kneading the mixture.

The mixing and kneading may be effected by means of an extruder, a Banbury mixer, a kneader or a roll at a temperature of 50–250° C., preferably 100–200° C., for a period of 2 minutes –1 hour, preferably about 3–45 minutes. The preferable mixing is effected by means of an internal mixer such as Banbury mixer, kneader or the like.

In this case, when the kneading temperature is less than 50° C. the control of the reaction is difficult and when the kneading temperature exceeds 250° C. the rubber tends to be deteriorated.

When the kneading time is shorter than 2 minutes the control of the reaction is difficult and a uniform composition is difficult to obtain. On the other hand, when the kneading time is longer than 1 hour the kneading cost increases, which is disadvantageous.

The kneading temperature during adding the crosslinking agent is usually 10–200° C., preferably 20–150° C., and when an organic peroxide is used, the kneading temperature during adding the crosslinking agent is preferably such a temperature that the half-life of the peroxide is 1 minute or more.

As discussed above, the above-mentioned cross-linking in this invention must be effected during the mixing. That is to say, during the mixing, a shearing force is applied to the elastomers, and therefore, the dispersed particles of the ethylene-α-olefin copolymer rubber (II) are kept smaller and entanglement of more molecules takes place at the interface.

In this case, when the application of a shearing force is stopped, association takes place between the fluoroelastomer (I) and the ethylene-α-olefin copolymer rubber (II), whereby the particles are made larger and the degree of entanglement of molecules is reduced.

Thus, the system can be fixed in a good dispersion state by crosslinking the ethylene-α-olefin copolymer rubber (II) simultaneously mixing it with the fluoroelastomer (I).

The rubber composition of this invention comprises the (I) component and the (II) component as the essential components and may further comprise other conventional elastomers, for example, diene rubbers such as styrene-butadiene rubber (SBR), isporene rubber (IR), acrylonitrile-butadiene rubber (NBR), chloroprene rubber (CR) and the like; or saturated rubbers such as butyl rubber, acrylic rubber, chlorosulfonated polyethylene and the like in a proportion of about 10% by weight or less based on the total weight of the (I) and (II) components, and also may comprise various compounding agents or additives.

These compounding agents or additives may, if necessary, be added in the course of producing the rubber composition of this invention, or after the production of the rubber composition.

The compounding agents or additives include reinforcing fillers, extenders, dispersing agents, plasticizers, softening agents, antioxidants, heat-resisting agents, coloring agents, ultraviolet rayabsorbing agents, flame retardants, oil resistanceimprovers, foaming agents, anti-scorching agents, tackifiers and the like.

The reinforcing fillers and extenders may be, for example, carbon black, fumed silica, wet silica, finely divided quartz, diatomaceous earth, zinc oxide, basic magnesium carbonate, active calcium carbonate, magnesium silicate, aluminum silicate, calcium silicate, titanium dioxide, talc, mica powder, aluminum sulfate, calcium sulfate, barium sulfate, asbestos, glass fiber, organic reinforcing agent and organic filler.

The dispersing agent includes higher fatty acids and their salts with metals and amines; the plasticizer includes, for example, phthalic acid derivatives and adipic acid derivatives; the softening agent includes, for example, lubricating oils, process oils, coal tar, castor oil and calcium stearate; the antioxidant includes, for example, phenylenediamines, phosphates, quinolines, cresols, phenols and metal dithiocarbamates; the heat-resisting agent includes, for example, iron oxide, cerium oxide, potassium hydroxide, iron naphthenate and potassium naphthenate.

The compounded rubber composition containing the above compounding agents or additives can be kneaded with a crosslinking agent for the fluoroelastomer (I) such as a combination of an organic peroxide with a crosslinking co-agent, a combination of an aromatic dihydroxy crosslinker-type vulcanizing agent with a vulcanizing accelerator or an amine-type vulcanizing agent by a conventional kneading means such as roll, Banbury mixer or the like and thereafter vulcanized under conventional conditions for producing vulcanized rubbers.

As the aromatic dihydroxy crosslinker-type vulcanizing agent, there are preferably used polyhydroxyaromatic compounds such as hydroquinone, bisphenol A, bis-phenol AF and salts thereof. Fluorine-containing aliphatic diols may also be used. These aromatic dihydroxy cross linker-types vulcanizing agents may be usually added in an amount of 0.1–20 parts by weight, preferably about 1 to 10 parts by weight, per 100 parts by weight of the fluoroelastomer composition.

As the vulcanization accelerator, preferred are quaternary ammonium compounds such as methyltrioctylammonium chloride, benzyltriethylammonium chloride, tetrahexylammonium tetrafluoroborate, 8-methyl-1,8-diazacyclo (5,4,0)-7-undecenyl chloride and the like; and quaternary phosphonium compounds such as benzyltriphenylphosphonium chloride, m-trifluoromethylbenzyltrioctylphosphonium chloride, benzyltrioctylphosphonium bromide and the like.

The amount of the vulcanization accelerator added is usually about 0.2–10 parts by weight per 100 parts by weight of the fluoroelastomer composition.

The amine-type vulcanizing agent includes alkylamines such as hexamethylenediamine, tetraethylenepentamine, triethylenetetramine and the like; aromatic amines such as aniline, pyridine, diaminobenzene and the like; and salts of these amines with fatty acids such as carbamic acid, cinnamylideneacetic acid and the like.

The amount of the amine-type vulcanizing agent added is usually 0.1–10 parts by weight, preferably about 0.5–5 parts by weight, per 100 parts by weight of the fluoroelastomer composition.

The vulcanization of the compounded rubber composition is achieved by subjecting the composition to primary vulcanization at a temperature of 80–200° C. for a period of several minutes to 3 hours at a pressure of 20–200 kg/cm$^2$ and if necessary secondary vulcanization at a temperature of 80–200° C. for a period of 1–48 hours, whereby a rubber article is produced.

As mentioned above, the rubber composition of this invention can be uniformly kneaded by a kneading means such as Banbury mixer, kneader, twin roll or the like. When it is intended to knead the vulcanizing agent, the vulcanization accelerator and the like with a mere mixture of the fluoroelastomer and the ethylene-α-olefin copolymer rubber (which may contain additives such as filler or the like) on roll a veryl long period of time is required for winding the mixture around the roll; however, the rubber composition of this invention can be wound around the roll in a moment and hence has a remarkably improved workability.

Moreover, rubber articles obtained by vulcanizing the rubber composition of this invention are excellent in heat resistance, weather resistance, compression set and resistance to compressive load, and can be used in the fields of general industry, electric industry and chemical industry.

Since the rubber composition of this invention has an excellent processability on roll and in extruder and is easy to mold and the vulcanizate thereof is excellent in heat resistance, compression set and resistance to compressive load, the rubber composition of this invention can be applied to the following fields: Oil-resistant, heat-resistant, steam-resistant or weather-resistant packings, O-rings, hoses, other sealants, diaphrams and valves in transportation facilities such as automobile, vessel, aircraft and the like; similar packings, rollings, sealants, diaphrams, valves, hoses, rolls and tubes in chemical plants; chemical-resistant coatings and linings in chemical plants; similar packings, O-rings, hoses, sealants, belts, diaphrams, valves, rolls and tubes in food plants and food facilities including domestic ones; similar packings, O-rings, hoses, sealants, diaphrams, valves and tubes in atomic power plants; similar packings, O-rings, hoses, sealants, diaphrams, valves, rolls, tubes, linings, mandrels, electric wires, flexible joints, belts, rubber plates and weather strips in general industrial parts; roll plates in PPC copying machines.

DESCRIPTION OF THE PREFERRED EMBODIMENTS OF THE INVENTION

This invention is explained in more detail below referring to Examples, which are not by way of limitation but by way of illustration. In the Examples, various measurements were made according to the following methods:

Processability on roll: To 6-in rolls was applied a rubber compound at a surface temperature of 50° C. at a friction ratio (front/rear) of 20/28 at a roll nip of 2 mm and the roll nip at which the rubber compound was completely wound around the roll was deterExtrusion Extrusion test: A rubber compound was subjected to a extruder under the following conditions and the surface skin of the extrudate was evaluated visualy:
Extruder: 50 mm, L/D=12; Screw revolution: 20 rpm; Head temperature: 70° C.;
Die: Tube type (15 mm in outer diameter, 10 mm in inner diameter)

Initial physical properties, aging test, steam immersion test, compression set test: Evaluated according to JIS K6301 using the conditions indicated in Table 1.

Resistance to compressive load (compression stress): Evaluated using a compression set test sample (right cylinder of 12.70 mm±0.13 mm in thickness and 29.0 mm in diameter) under the following conditions:
Measuring temperature: 150° C.
Compressing rate: 10 mm/min
Compression ratio: 0-50%
Tester: IS 5000 (autograph produced by Toyo Seiki Seisakusho)

EXAMPLES 1–7 AND COMPARATIVE EXAMPLES 1–5

Aflas 150P (product of Japan Synthetic Rubber Co., Ltd.) as a fluoroelastomer, JSR EP02P (product of Japan Synthetic Rubber Co., Ltd.) as an ethylene-α-olefin copolymer rubber, sodium stearate as a processing adjuvant, Nipsil LP (product of Nippon Silica Kogyo K.K.) as a silica type filler and Silane Coupling Agent TSL 8380 (product of Toshiba Silicone K.K.) were placed in a rubber mixer (70–100° C., 60 rpm) in this order and milled therein. When a uniform state was reached Percadox 14 (trade name of Kayaku Noury Corp. for α,α'-bis(t-butyl-peroxy)-p-diisopropylbenzene) as an organic peroxide was added and the resulting mixture was milled. When a uniform state was reached again, the temperature was elevated to 170–180° C. and after the milling torque and rubber temperature became substantially constant (after about 10–20 minutes), Irganox 1010 (product of CibaGeigy Corp.) as an anti-oxidant was added to the mixture and the mixture was milled. When a uniform state was reached again, the mixture was taken out.

Subsequently, the rubber taken out was wound around a twin roll mill and processability was evaluated. Subsequently, compounding agents such as vulcanizing agent, vulcanizing co-agent and the like as shown in Table 1 were added to the rubber and the mixture was milled, and then press-cured (100–150 kg/cm$^2$, 170° C. x 20 min), after which physical properties of the vulcanizate obtained were measured. The results obtained are shown in Table 1.

In the same manner, the other rubber compositions were prepared with the recipes shown in Table 1 and processability thereof and physical properties of vulcanizates thereof were measured to obtain the results shown in Table 1.

EXAMPLES 8–10

Viton E60 (product of DuPont, U.S.A.) and Aflas 200 (product of Japan Synthetic Rubber Co., Ltd.) or Viton GF (product of DuPont U.S.A.) as fluoroelastomers and JSR EP02P (product of Japan Synthetic Rubber Co., Ltd.) as an ethylene-α-olefin copolymer rubber were milled in the same manner as in Example 1, and when a uniform state was reached, the same organic peroxide as in Example 1 and optionally triallyl isocyanurate were added to the mixture and the resulting mixture was milled, after which the same procedure as in Example 1 was repeated.

Compounding recipe and evaluation results are shown in Table 2.

TABLE 1

| | Example 1 | Example 2 | Example 3 | Example 4 | Example 5 | Example 6 | Example 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| [Compounding recipe (parts by weight)] | | | | | | | | | | | | |
| Fluoroelastomer (I) | | | | | | | | | | | | |
| Alfas 150P | 81 | 65 | 81 | — | — | 81 | 81 | 81 | 81 | 100 | 100 | — |
| Aflas 150E | — | — | — | 81 | — | — | — | — | — | — | — | — |

TABLE 1-continued

|  | Example 1 | Example 2 | Example 3 | Example 4 | Example 5 | Example 6 | Example 7 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|
| Viton GF | — | — | — | — | 83 | — | — | — | — | — | — | — |
| Ethylene-α-olefin copolymer rubber (II) | | | | | | | | | | | | |
| JSR EP02P | 19 | 35 | 19 | 19 | 17 | — | — | 19 | 19 | — | — | 100 |
| JSR EP22 | — | — | — | — | — | 19 | — | — | — | — | — | — |
| JSR EP87 | — | — | — | — | — | — | 19 | — | — | — | — | — |
| Crosslinking agent (organic peroxide) | | | | | | | | | | | | |
| α,α'-bis(t-butylperoxy)-p-diisopropylbenzene (Percadox 14) | 0.5 | 0.5 | 0.5 | 0.5 | 0.5 | 0.5 | 0.5 | — | — | 0.5 | — | — |
| Other compounding chemicals | | | | | | | | | | | | |
| Sodium stearate | 1 | 1 | 1 | 1 | 1 | 1 | 1 | 1 | 1 | 1 | 1 | 1 |
| Nipsil LP | 10 | 10 | — | — | 10 | 10 | 10 | 10 | — | 10 | 10 | 10 |
| MT carbon | — | — | 25 | 25 | — | — | — | — | 25 | — | — | — |
| 3-Mercaptopropyltrimethoxysilane | 1 | 1 | 1 | 1 | 1 | 1 | 1 | 1 | 1 | 1 | 1 | 1 |
| Irganox 1010 | 2 | 2 | 2 | 2 | 2 | 2 | 2 | 2 | 2 | 2 | 2 | 2 |
| Triallyl isocyanurate | 4 | 4 | 4 | 4 | 4 | 4 | 4 | 4 | 4 | 4 | 4 | 4 |
| α,α'-bis(t-butylperoxy)-p-diisopropylbenzene (Percadox 14) | 1.5 | 1.5 | 1.5 | 1.5 | 1.5 | 1.5 | 1.5 | 1.5 | 1.5 | 1.5 | 1.5 | 1.5 |
| [Evaluation results] | | | | | | | | | | | | |
| Processability on roll | | | | | | | | | | | | |
| Roll nip at which rubber compound can be wound around roll (mm) | >2 | >2 | >2 | >2 | >2 | >2 | >2 | 0.5 | 1 | 1 | >2 | 0.5 |
| Extrusion test | excellent | excellent | excellent | excellent | excellent | excellent | excellent | good | poor | good | poor | poor |
| Initial physical properties | | | | | | | | | | | | |
| Tensile strength (kgf/cm$^2$) | 148 | 140 | 149 | 127 | 162 | 146 | 159 | 140 | 137 | 157 | 176 | 117 |
| Elongation (%) | 250 | 240 | 250 | 240 | 200 | 260 | 270 | 300 | 250 | 300 | 360 | 320 |
| Aging test (air-heating degradation, 200° C. × 70 hr) | | | | | | | | | | | | |
| Tensile strength (kgf/cm$^2$) | 133 | 116 | 128 | 82 | 123 | 149 | 153 | 112 | 127 | 162 | 168 | hardened |
| Elongation (%) | 180 | 110 | 170 | 170 | 100 | 220 | 200 | 200 | 200 | 260 | 300 | — |
| Steam immersion test (170° C. × 70 hr) | | | | | | | | | | | | |
| Tensile strength (kgf/cm$^2$) | 147 | 144 | 145 | 116 | 120 | 148 | 153 | 131 | 124 | 130 | 144 | 97 |
| Elongation (%) | 270 | 260 | 210 | 200 | 180 | 250 | 260 | 240 | 220 | 330 | 370 | 320 |
| Compression set test (200° C. × 70 hr) | | | | | | | | | | | | |
| CS (%) | 22 | 20 | 24 | 20 | 32 | 25 | 23 | 28 | 30 | 35 | 33 | 100 |
| Compression stress test (150° C. × 50% compressed) | 44 | 50 | 44 | 49 | 52 | 50 | 46 | 31 | 39 | 23 | 29 | 51 |

TABLE 2

|  | Example 8 | Example 9 | Example 10 |
|---|---|---|---|
| [Compounding recipe (parts by weight)] | | | |
| Fluoroelastomer (I) | | | |
| Viton E60 | 72 | 72 | 72 |
| Viton GF | — | — | 11 |
| Aflas 200 | 11 | 11 | — |
| Ethylene-α-olefin copolymer rubber (II) | | | |
| JSR EP02P | 17 | 17 | 17 |
| Crosslinking agent (organic peroxide) | | | |
| α,α'-bis(t-butylperoxy)-p-diisopropylbenzene | 0.5 | 0.5 | 0.5 |
| Crosslinking co-agent | | | |
| Triallyl isocyanurate | — | 1 | 1 |
| Other compounding chemicals | | | |
| Sodium stearate | 1 | 1 | 1 |
| Nipsil LP | 10 | 10 | 10 |
| Magnesium oxide #150 | 3 | 3 | 3 |
| Calcium hydroxide | 6 | 6 | 6 |
| 3-Mercaptopropyltrimethoxysilane | 1 | 1 | 1 |
| Irganox 1010 | 2 | 2 | 2 |
| Curative #25 (DuPont) | 1.65 | 1.65 | 1.65 |
| Curative #30 (DuPont) | 4 | 4 | 4 |
| [Evaluation results] | | | |
| Processability on roll | | | |
| Roll nip at which rubber compound can be wound around roll (mm) | >2 | >2 | >2 |
| Initial physical properties | | | |

TABLE 2-continued

|  | Example 8 | Example 9 | Example 10 |
|---|---|---|---|
| Tensile strength (kgf/cm$^2$) | 135 | 156 | 143 |
| Elongation (%) | 230 | 210 | 200 |
| Aging test (air-heating degradation (200° C. × 70 hr) | | | |
| Tensile strength (kgf/cm$^2$) | 120 | 139 | 131 |
| Elongation (%) | 160 | 170 | 160 |
| Steam immersion test (170° C. × 70 hr) | | | |
| Tensile strength (kgf/cm$^2$) | 123 | 143 | 136 |
| Elongation (%) | 250 | 210 | 210 |
| Compression set test (200° C. × 70 hr) | | | |
| CS (%) | 31 | 22 | 24 |
| Compression stress test (150° C. × 50% compressed) (kgf/cm$^2$) | 44 | 50 | 48 |

What is claimed is:

1. A rubber composition obtained by subjecting a mixture of (I) 35–95 parts by weight of a fluoroelastomer and (II) 65–5 parts by weight of an ethylene-α-olefin copolymer rubber in which the total of the (I) component and the (II) component is 100 parts by weight and a crosslinking agent for the copolymer rubber (II) to reaction while imparting shearing deformation to the mixture.

2. The rubber composition according to claim 1, wherein the crosslinking agent is an organic peroxide.

3. The rubber composition according to claim 2, wherein the organic peroxide is selected from the group consisting of 2,5-dimethyl-2,5-di(t-butylperoxy)hexyne-3,2,5-dimethyl-2,5-di(t-butylperoxy)hexane and α,α'-bis(t-butylperoxy)-p-diisopropylbenzene.

4. The rubber composition according to claim 1, 2 or 3, wherein the amount of the crosslinking agent is 0.01 to 5 parts by weight per 100 parts by weight of the mixture of the fluoroelastomer (I) and the ethylene-α-olefin copolymer rubber (II).

5. The rubber composition according to claim 1, wherein the fluoroelastomer (I) is selected from the group consisting of vinyl fluoride-hexafluoropropylene copolymer, vinylidene fluoride-hexafluoropropylene-tetrafluoroethylene terpolymer, tetrafluoroethylene-propylene copolymer and tetrafluoroethylene-vinylidene fluoride-propylene terpolymer.

6. The rubber composition according to claim 1, wherein the fluoroelastomer (I) has a Mooney viscosity (ML$_{1+4}$, 100° C.) of 30 to 150.

7. The rubber composition according to claim 1, wherein the ethylene-α-olefin copolymer rubber is a copolymer of ethylene with at least one α-olefin selected from the group consisting of propylene, butene-1, 4-methylpentene-1, hexene-1 and octene-1.

8. The rubber composition according to claim 1, wherein the ethylene-α-olefin copolymer rubber (II) has a Mooney viscosity (ML$_{1+4}$, 100° C.) of 5 to 150.

9. The rubber composition according to claim 1, wherein the mixture consists of 65–90 parts by weight of the fluoroelastomer (I) and 35–10 parts by weight of the ethylene-α-olefin copolymer rubber (II) in which the total of the (I) component and the (II) component is 100 parts by weight.

10. A rubber article obtained by subjecting a mixture of (I) 35–95 parts by weight of a fluoroelastomer and (II) 65–5 parts by weight of an ethylene-α-olefin copolymer rubber in which the total of the (I) component and the (II) component is 100 parts by weight and a crosslinking agent for the ethylene-α-olefin copolymer rubber (II) to reaction while imparting shearing deformation to the mixture and then subjecting the rubber composition thus obtained and a crosslinking agent for the fluoroelastomer (I) and optionally at least one additive to reaction.

11. The rubber article according to claim 10, wherein the additive is selected from the group consisting of reinforcing fillers, extenders, dispersing agents, plasticizers, softening agents, antioxidants, heat-resisting agents, coloring agents, ultraviolet ray-absorbing agents, flame retardants, oil resistance-improvers, foaming agents, anti-scorching agents and tackifiers.

12. The rubber article according to claim 10, wherein the crosslinking agent for the component (II) is an organic peroxide.

13. The rubber article according to claim 12, wherein the organic peroxide is selected from the group consisting of 2,5-dimethyl-2,5-di(t-butylperoxy)hexyne-3,2,5-diethyl-2,5-di(t-butylperoxy)hexane and α,α'-bis(t-butylperoxy)-p-diisopropylbenzene.

14. The rubber article according to claim 10, 12, or 13, wherein the amount of the crosslinking agent for the component (II) is 0.01 to 5 parts by weight per 100 parts by weight of the mixture of the fluoroelastomer (I) and the ethylene-α-olefin copolymer rubber (II).

15. The rubber article according to claim 10, wherein the fluoroelastomer (I) is selected from the group consisting of vinyl fluoride-hexafluoropropylene copolymer, vinylidene fluoride-hexafluoropropylene-tetrafluoroethylene terpolymer, tetrafluoroethylene-propylene copolymer and tetrafluoroethylene-vinylidene fluoride-propylene terpolymer.

16. The rubber article according to claim 10, wherein the fluoroelastomer (I) has a Mooney viscosity (ML$_{1+4}$, 100° C.) of 30 to 150.

17. The rubber article according to claim 10, wherein the ethylene-α-olefin copolymer rubber is a copolymer of ethylene with at least one α-olefin selected from the group consisting of propylene, butene-1, 4-methylpentene-1, hexene-1 and octene-1.

18. The rubber article according to claim 10, wherein the ethylene-α-olefin copolymer rubber (II) has a Mooney viscosity (ML$_{1+4}$, 100° C.) of 5 to 150.

19. The rubber article according to claim 10, wherein the mixture consists of 65–90 parts by weight of the fluoroelastomer (I) and 35–10 parts by weight of the ethylene-α-olefin copolymer rubber (II) in which the total of the (I) component and the (II) component is 100 parts by weight.

20. The rubber article according to claim 10, wherein the crosslinking agent for the fluoroelastomer (I) is a combination of an organic peroxide and a cross-linking co-agent, a combination of an aromatic dihydroxy crosslinker-type vulcanizing agent with a vulcanizing accelerator or an amine-type vulcanizing agent.

* * * * *